Patented May 27, 1952

2,597,889

UNITED STATES PATENT OFFICE 2,597,889

DRYING A SILICA-ZIRCONIA HYDROGEL CONTAINING AN ALKALI SALT

Thomas Henry Milliken, Jr., Moylan, Pa., and Irving H. Welinsky, Claymont, Del., assignors to Houdry Process Corporation, Wilmington, Del., a corporation of Delaware No Drawing. Application September 1, 1945, Serial No. 614,094

7 Claims. (Cl. 252—454)

1

The present invention relates to new and improved methods for the production of gel type catalysts containing silica and zirconia.

In the field of gel catalysts three physical forms are of major importance. These forms are powder, pieces composed of agglomerated powder or smaller gel pieces, and individual pieces of dried gel. Agglomeration involves the formation of unitary pieces of preferably regular shapes, from smaller particles such as from finely comminuted gel. The present invention is particularly applicable to the manufacture of the agglomerated type of catalyst.

With catalysts in the form of pieces, particularly catalysts of the agglomerated type, one of the important characteristics that requires consideration is the physical strength or hardness of the catalyst. By drying of hydrogels composed of silica and zirconia, particularly those of pH below 7, catalysts of advantageous high activity are obtainable, but agglomerated units made therefrom by prior customary methods do not have the desired physical strength. The physical strength herein referred to has reference to the comparative ability of the catalyst pieces to withstand fracture or disintegration such as by crushing and shearing stresses. This property is also designated herein as the "hardness" of the catalyst, and can be measured by a test hereinafter described.

It is an object of the present invention to provide methods for the production of silica-zirconia catalyst of improved properties.

The present invention is based on the discovery that agglomerated gel catalysts of improved physical strength can be obtained from hydrogels containing silica and zirconia, if the hydrogel contains during drying a soluble salt, present in an amount as hereinafter set forth. From the standpoint of desired high activity and other performance characteristics catalysts prepared by drying of silica-zirconia hydrogels of pH below 7 are preferred. Agglomerated catalysts prepared from hydrogels in this pH range, however, are often comparatively deficient in desired physical strength, and the proposed addition of soluble salt thereto, in accordance with the present invention, is, therefore, of particular significance.

In the reaction between a soluble silicate and a zirconium salt to produce primarily silica and zirconia, it is readily apparent that some soluble salt is produced. For instance, if "N-Brand" sodium silicate is coprecipitated with zirconium sulfate, sodium sulfate will be formed in an amount limited by the sodium content of the silicate. In this instance, since "N-Brand" silicate contains about 0.3 mol of $Na_2O$ per mol of silica, the maximum soluble salt that can be formed from these reactants is 0.3 mol for each mol of silica, or one mol of salt for each mol of original silicate. Addition of an acid, for instance sulfuric acid, for the purpose of controlling the pH of the hydrogel, although supplying additional sulfate ions, does not increase the amount of salt formed in the reaction, since the same is limited by the available sodium ion. To obtain the advantage of improved hardness, in accordance with the present invention, there must be present in the hydrogel during its drying a quantity of soluble salt in excess of that normally contributed by the primary reactants forming silica and zirconia at the particular pH of the reaction.

Altho the amount of excess soluble salt required for superior hardness is to some extent influenced by the pH of the hydrogel, more salt being required at lower pH, it can be generally stated, that improved hardness of practical significance requires an excess of at least one chemical equivalent of soluble salt cation in addition to that formed from the silicon and zirconium compounds entering into the primary reaction. It should be understood that the salt is not necessarily present as an undissociated molecule, but may be present in solution in the form of its constituent ions.

In accordance with the preferred embodiment of the invention, a plural hydrogel of silica and zirconia and of a pH below 7 is prepared. The hydrogel is so made or treated that it contains the required amount of soluble salt when submitted to initial drying.

Following drying the resulting gel is subjected to finishing operations as hereinafter described, which will include, according to the preferred embodiment, purification for the removal of soluble cation and the formation of discrete particulate masses suitable for use as catalyst. For instance, the dried gel, after purification, is made into a paste from which agglomerated pieces are formed. The agglomerates are then dried and calcined at high temperature.

In the inorganic gel art confusion has arisen with respect to the meaning of various terms. Accordingly, in this specification, the following terms have the meanings here stated. A "hydrogel" is any true gel or gelatinous precipitate in its moist state before drying to the point that a rigid structure is produced. A "dried gel" is the product of drying any hydrogel to the point that a rigid gel structure is obtained. In this state the gel has a sandy or glassy appearance. A "wet dried gel" is a dried gel to which water or hydrogel is added, having the appearance of wet sand or wet clay.

Various modes of compositing silica and zirconia gels are known in the art. These methods include coprecipitation of a hydrogel containing silica and zirconia from a soluble silicate, and a zirconium salt, such as zirconium sulfate or an alkali zirconium carbonate, for instance ammonium zirconium carbonate. Other methods involve: the separate precipitation of silica and zirconia hydrogels followed by mixing of the prepared hydrogels; the suspension of a hydrogel of one of the two in a solution of the other and the precipitation of the latter upon the suspended hydrogel; and the impregnation of a hydrogel of one with a solution of the other, followed by hydrolysis of the material in solution. While in some situations differing results are obtained by these various methods, all of these various compositing methods are applicable in the process of the present invention.

As above indicated the composition of the hydrogel is controlled in accordance with the preferred embodiment of the invention so that at the time of drying the composited silica and zirconia hydrogel will have a pH of less than 7. The special advantages of improved hardness are particularly evident in connection with agglomerated catalysts prepared from hydrogels having a pH less than 6, and especially a pH between 5 and 6. The desired pH may be produced in the preparation of the hydrogel as by the coprecipitation of the two at the required pH or the composited hydrogels may be adjusted to that pH by the addition of acid or an acidic salt.

As above indicated, a portion of the required soluble salt is obtained from the reactants from which the silica and zirconia hydrogel are prepared. The supplemental salt required in accordance with the present invention may be introduced into the gel by precipitating the gel from solutions which contain added salt of a suitable cation, or salt forming materials may be added to the reactants. Thus, referring to the reaction hereinbefore illustrated, caustic soda may be added to the "N-Brand" silicate and sulfuric acid added in greater amount to the zirconium sulfate solution to neutralize this caustic soda. Alternatively, the salt may be introduced following preparation of the hydrogel, as by dialysis or by mixing a salt such as ammonium sulfate or sodium sulfate in solid state or in solution into the gel. It has been found, however, that more pronounced increase in hardness is obtained when the added soluble salt is present in the sol during its formation and prior to its setting to a gel.

The added portion of soluble salt may be of the same or a different salt from that formed in the primary reaction producing the plural gel, as to its cationic component, its anionic component, or both. All or a portion of the required salt may be obtained from the salt removed in the purification of the gel, which may be recirculated to make up the desired amount of soluble salt present during drying.

As hereinbefore indicated, the amount of soluble salt to be added in accordance with the invention to obtain superior hardness should be at least the equivalent stoichiometrically to the quantity of soluble salt formed or capable of being formed as a result of the primary reaction to produce the gel. Although the stated improved properties may already be evidenced when the soluble salt is present in the aforesaid proportion, it is preferred to have present during drying of the hydrogel an amount of soluble salt equivalent to two or three times that being formed from the primary reactants. Improved catalyst pellets from the standpoint of physical strength can be obtained with a higher content of soluble salt up to the limit of its solubility. Since the effect of the salt is apparently determined by its presence in solution in the hydrogel, the addition of an amount of salt in excess of such solubility appears to be of no advantage.

Though a wide range of soluble salts may be employed, it is preferred that the salt be an alkali salt the term "alkali salt" as herein employed meaning alkali metal and ammonium salts. When an alkali metal salt is present during the drying, the gel should be purified by removal of the alkali metal, to obtain the best results with respect to activity and stability of the catalyst in use. The purification is preferably effected by washing with water and, if desired, also with solutions of such materials as ammonium salts or zirconium salts. It is unnecessary to take special precautions to remove ammonium cations from the gel inasmuch as these will be driven off either in calcination prior to use or during use in hydrocarbon conversion operations.

To prepare the catalyst in the form of agglomerates, such as pellets for instance, it is desirable to first make a paste from the dried gel by adding water or hydrogel thereto and mulling the mixture. In case the dried gel is coarse, it is preferably ground prior to pasting. The paste of wet dried gel is formed into particulate masses in any suitable manner such as by extrusion or casting, and is subsequently dried. The so-formed pieces are then calcined, preferably prior to introduction into the reactor where they are to be employed, though the pieces may alternatively be introduced into the zone of use where calcination will occur upon the first regeneration of the pieces. Calcination is effected by heat treating the catalyst pieces at a temperature above about 800° F., in the presence of bone dry air or mixtures of air and water vapor, or of steam. Calcination can likewise be effected in a vacuum. The calcination develops the hardness of the pellets, the hardness produced being greater upon calcination when the hydrogel is dried as above described than if dried in the absence of soluble salt in the amount stated.

A preferred form of the present invention involves drying of the silica-zirconia hydrogel in the presence of added ammonium salts. The ammonium salts have a similar effect in increasing hardness as do other soluble salts, and do not have to be washed out.

The catalysts described in the following examples and other catalysts prepared in accordance with the invention are especially valuable when employed in cracking and reforming processes for the treatment of hydrocarbons such as petroleum fractions. Such processes may be fixed bed processes or processes in which the catalyst moves through the reaction zone. As an example of a fixed bed operation, cracking may be carried out at a temperature of 800° F. to 900° F., employing a liquid space rate (volume of liquid charge per volume of catalyst per hour) of about 1.5, and a pressure of about 15 pounds per square inch gauge. The temperature, of course, may be varied within the range of about 700° to 1100° F., the space rate within the range of about 0.5 to about 3, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

The following examples are illustrative of the present invention and should not be considered as definitive thereof.

Example I

A solution was prepared which contained 47.5 parts by weight of "N-Brand" silicate (3.3 mols of silica per mol of sodium oxide), and 20.4 parts of water, which solution had a specific gravity of 1.25. A second solution was prepared which contained 11.38 parts by weight of zirconium sulfate, 2.25 parts of 96% sulfuric acid, and 3.48 parts glacial acetic acid in 25.8 parts of water, which solution had a specific gravity of 1.122. A third solution was prepared which contained 14.1 parts by weight of ammonium sulfate in 43 parts of water and had a specific gravity of 1.141. These three solutions were mixed at relative rates by volume as follows: 54.3 parts silicate, 38.2 parts acidic zirconium sulfate, and 50.7 parts ammonium sulfate. This rate of introduction of ammonium sulfate was sufficient to supply 1.6 mols or equivalents of ammonium ion per equivalent of sodium ion derived from the silicate. A hydrogel set from the mixed solutions at a pH of 5.3. The hydrogel still containing the sodium and ammonium salts was dried for 16 hours at a temperature of 200–210° F. The dried gel was washed with water and with ammonium chloride solution to free it of sodium ion. The resulting wet dried gel was then dried, ground in a ball mill, made into a paste by the addition of water, and cast as pellets which were dried and heat treated at 1400° F. The pellets had a hardness of 1300 grams and an activity, when tested in the cracking of a light gas oil, of 39% gasoline.

A duplicate catalyst was prepared, the same in all respects, except that it did not have ammonium sulfate added thereto. The water employed in making the ammonium sulfate solution was added to the acidic zirconium sulfate solution whereby the concentration of silica and zirconia in the gel formed was the same as in the gel described above. This gel was finished as catalyst by the same method. The pellets produced had a hardness of 800 grams and an activity of 36% gasoline.

Example II

A catalyst was prepared from identical concentrations of reactants and salt as in the preceding example, except that the ammonium sulfate was added at a point in a mixing head approximate the point of introduction of the silicate to assure the presence of the added salt during the formation of the sol by the reaction of the silicate solution with the acidified zirconium salt solution. The hydrogel formed from the mixed solutions was treated and pelleted similarly to that of the preceding example. The pellets so obtained had a hardness of 2700 grams.

Example III

A solution was prepared containing 31.4 parts by weight of "N-Brand" silicate, 6.4 parts anhydrous sodium sulfate, and 26.5 parts of water, which solution had a specific gravity of 1.281. A second solution was prepared from 7.72 parts by weight zirconium sulfate, 2.79 parts of 96% sulfuric acid, 12.8 parts anhydrous sodium sulfate, and 40.08 parts of water, which solution had a specific gravity of 1.253. The two solutions were continuously mixed in equal parts by volume. Upon mixing a floc formed, and a gel set up in about 10 minutes, which hardened upon standing, and had a pH of 4. The gel was aged for one hour with steam. It was then dried rapidly to the dried gel state. The dried gel was washed with water, with a solution of ammonium chloride till free of sodium, and again with water till the wash water was free of chloride ion. The wet dried gel was finished, as in Example I, in the form of pellets. After heat treating at 1400° F., the catalyst pellets so produced had a hardness of 1050. The gel during drying contained approximately 3 equivalents of sodium ion in addition to each equivalent derived from the silicate.

A comparable gel was prepared from duplicate solutions to which supplemental sodium sulfate was not added. Catalyst pellets produced therefrom had a hardness of only 200.

Example IV

A gel was prepared from solutions the same as those employed in Example III, except that the sulfuric acid was reduced to 2.5 parts. The gel produced had a pH of 5.5. The gel was finished as catalyst as described in Example III. The catalyst pellets had a hardness of 3900. 3 equivalents of added sodium ion for each equivalent of sodium derived from the silicate were present in the gel upon drying. A similar gel was prepared at a pH of 5.5 which contained during drying only the sodium salt derived from the primary reaction. The catalyst pellets produced therefrom had a hardness of 330.

The hardness of catalyst pellets referred to above was measured with pellets in the form of cylinders having a diameter of 4 mm. and a length of 4 mm. A knife edge, of the type employed in analytical balances, was rested upon the peripheral surface of the pellets transversely of the axis and loaded. The load in grams supported by the pellet at the time of breakage is the hardness referred to above. All pellets referred to in the examples were heat treated prior to the hardness test at 1400° F.

The activity of the catalyst referred to in Example I was determined in accordance with the method described by Alexander and Shimp in "Laboratory Method for Determining the Activity of Cracking Catalysts," National Petroleum News, Technical Edition, p. R-537, August 2, 1944.

We claim as our invention:

1. The method of producing agglomerated silica-zirconia gel pieces, which comprises drying a hydrogel containing silica and zirconia, having a pH less than 7, which hydrogel contains alkali salt in excess of that producible by the reaction forming the hydrogel, purifying the obtained dried gel of alkali metal cations, preparing a paste of the dried gel, forming the paste into agglomerated pieces, and drying and calcining the formed pieces.

2. The method of producing agglomerated silica-zirconia gel pieces, which comprises drying a hydrogel containing silica and zirconia, having a pH less than 7, which hydrogel contains during drying ammonium and sodium salts, purifying the dried gel of sodium, preparing a paste of the dried gel, forming the paste into agglomerated pieces, and drying and calcining the formed pieces, said ammonium and sodium salts being present in said hydrogel in at least twice the mol quantity, on the basis of cation, of soluble salts resulting as by-product in the formation of the hydrogel.

3. The method of preparing a catalyst, which comprises mixing together under acid conditions a solution of a zirconium salt, an alkali metal silicate and a water soluble alkali salt, said water soluble alkali salt being present in a quantity furnishing at least one chemical equivalent of soluble salt cation in addition to that formed from said alkali metal silicate and said zirconium salt permitting the mixture to set to a hydrogel, drying the hydrogel in the presence of its original salt content, washing the resulting gel to remove alkali metal cation, grinding, pasting and agglomerating the gel, and calcining the formed agglomerates.

4. The method of preparing a silica-zirconia catalyst which comprises preparing a hydrogel from the admixture of an acid solution of zirconium salt, an alkali metal silicate and ammonium sulfate, in such proportions that the reaction mixture is below pH 7 and contains at least one mol of ammonium sulfate per mol of silicate in addition to soluble alkali metal salt formed in the reaction, and drying the hydrogel in the presence of the ammonium sulfate and the soluble alkali metal salt formed by the reaction.

5. The method of producing a catalyst of improved hardness which comprises forming an acid sol by admixing a buffered acid solution of zirconium sulfate with a solution of sodium silicate in the presence of an added quantity of water soluble alkali salt not less mol for mol than the quantity of said silicate, permitting the sol to set to a hydrogel, and drying the hydrogel in the presence of the salts added and that formed by the reaction mixture.

6. The method of producing agglomerated silica-zirconia gel pieces, which comprises preparing an acid hydrogel by reacting sodium silicate and a water soluble zirconium salt, drying the hydrogel in the presence of soluble sodium salt derived from the silicate and in the presence of supplemental alkali salt incorporated in an amount furnishing cations at least equivalent in quantity to that of the sodium ion derived from the silicate, purifying the obtained dried gel to remove alkali salts, preparing a paste of the dried gel, forming the paste into agglomerated pieces, drying and calcining the formed pieces, and recirculating for use as supplemental salt for incorporation with hydrogel, alkali salt removed from the dried gel in the purifying step.

7. In the preparation of a dry catalyst from a non-basic hydrogel formed from soluble zirconium salt and alkali metal silicate, the step of drying the hydrogel in the presence of the total dissolved alkali metal salt contained therein as a result of the primary reaction forming the hydrogel and an amount of added alkali metal salt furnishing about three equivalents of alkali metal cation for each equivalent of cation derived from the alkali metal silicate.

THOMAS HENRY MILLIKEN, JR.
IRVING H. WELINSKY.

REFERENCES CITED

The following references are of record in the file of this patent:

UNITED STATES PATENTS

| Number | Name | Date |
|---|---|---|
| 1,935,176 | Connolly | Nov. 14, 1933 |
| 2,165,578 | Rembert | July 11, 1939 |
| 2,197,861 | Hyman | Apr. 23, 1940 |
| 2,232,727 | Peterkin et al. | Feb. 25, 1941 |
| 2,280,650 | Kassel | Apr. 21, 1942 |
| 2,289,913 | Lee et al. | July 14, 1942 |
| 2,375,756 | Bates | May 15, 1945 |
| 2,417,054 | Bond | Mar. 11, 1947 |
| 2,433,869 | Shabaker | Jan. 6, 1948 |
| 2,442,784 | Shabaker | June 8, 1948 |